United States Patent
MacPhail-Fausey

(10) Patent No.: US 7,753,434 B2
(45) Date of Patent: Jul. 13, 2010

(54) CLIP-IN WINDOW ASSEMBLY FOR VEHICLES

(75) Inventor: Bryan Daniel MacPhail-Fausey, Fenton, MI (US)

(73) Assignee: Dura Global Technologies, LLC, Rochester Hills, MI (US)

(*) Notice: Subject to any disclaimer, the term of this patent is extended or adjusted under 35 U.S.C. 154(b) by 266 days.

(21) Appl. No.: 11/870,034

(22) Filed: Oct. 10, 2007

(65) Prior Publication Data

US 2009/0145040 A1    Jun. 11, 2009

(51) Int. Cl.
*B60J 5/04* (2006.01)
(52) U.S. Cl. ............... 296/146.15; 296/90; 296/96.22; 52/208; 52/204.54; 52/204.56
(58) Field of Classification Search .......... 52/208, 52/204.54, 204.56; 296/96.21, 96.22, 93, 296/146.15, 201, 90
See application file for complete search history.

(56) References Cited

U.S. PATENT DOCUMENTS

| | | | |
|---|---|---|---|
| 2,672,959 A | 3/1954 | Young | |
| 4,561,223 A | 12/1985 | Gold | |
| 4,606,159 A | 8/1986 | Kunert | |
| 4,768,319 A | 9/1988 | Derner | |
| 4,951,907 A | 8/1990 | Gold | |
| 5,489,354 A * | 2/1996 | Gold | ............... 156/108 |
| 5,584,526 A * | 12/1996 | Soldner | ............ 296/146.15 |
| 5,707,101 A * | 1/1998 | Rice | ............... 296/193.04 |
| 6,010,180 A | 1/2000 | Bureau | |
| 6,044,589 A | 4/2000 | Dallos | |
| 6,224,136 B1 | 5/2001 | Takagi | |
| 6,378,931 B1 | 4/2002 | Kolluri | |
| 7,469,509 B2 * | 12/2008 | Cripe | ............... 52/208 |
| 2004/0251714 A1 | 12/2004 | Hintzke | |
| 2007/0063539 A1 * | 3/2007 | DiMario et al. | ......... 296/146.15 |
| 2007/0130851 A1 * | 6/2007 | Cripe | ............... 52/204.7 |

* cited by examiner

*Primary Examiner*—Glenn Dayoan
*Assistant Examiner*—SunSurraye Westbrook
(74) *Attorney, Agent, or Firm*—Porter Wright Morris & Arthur LLP; Richard M. Mescher; Dean B. Watson

(57) ABSTRACT

A window assembly for a vehicle having a body panel comprises, in combination, a glazing panel having a peripheral edge, a gasket secured to the glazing panel for sealing the peripheral edge to the body panel, at least one clip receiver secured to the glazing panel near the peripheral edge, and at least one fastener clip clamping the clip receiver to the body panel. The fastener clip is preferably U-shaped having a pair of resilient legs receiving the body panel and the clip receiver therebetween. The fastener clip is preferably secured to the clip receiver in a manner in which the fastener clip is movable between a shipping position and a securing position. A detent is preferably formed between the fastener clip and the clip receiver to resist removal of the fastener clip from the clip receiver.

20 Claims, 3 Drawing Sheets

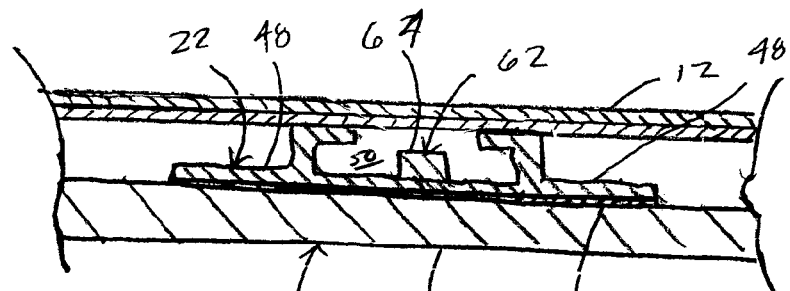
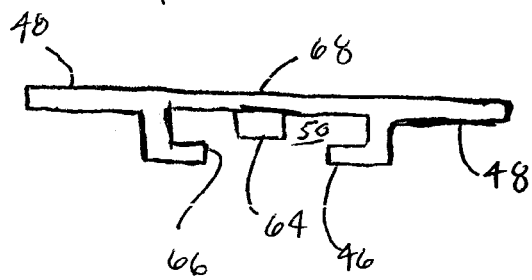
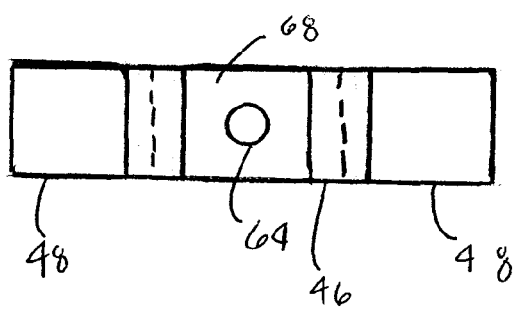
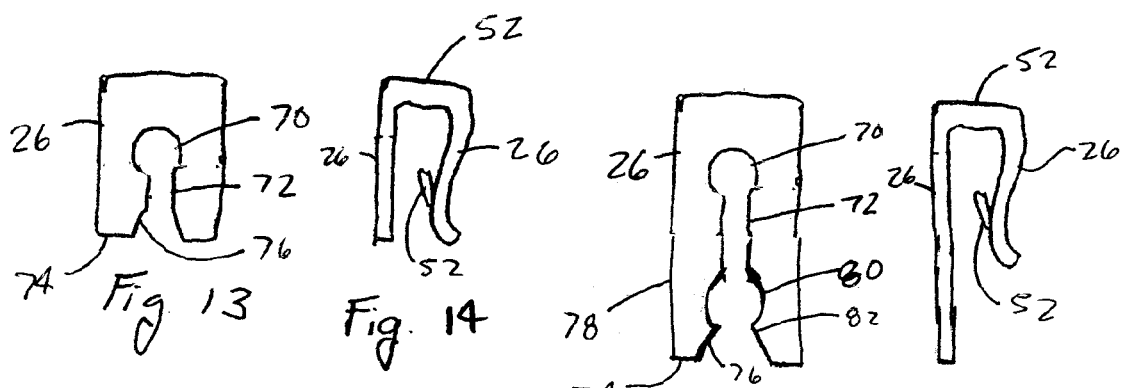
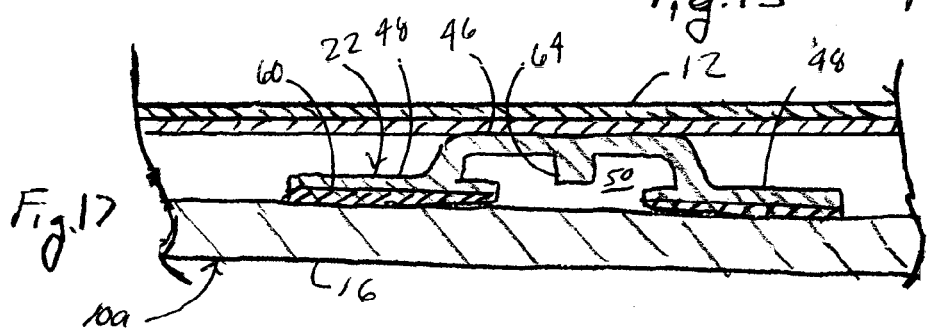

CLIP-IN WINDOW ASSEMBLY FOR VEHICLES

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to window assemblies for vehicles and, more particularly, to window assemblies which are clipped to the vehicles.

BACKGROUND OF THE INVENTION

Currently, window glass for motor vehicles is directly bonded in position using a urethane adhesive around the window glass to both secure and seal the window glass or is provided with threaded studs that accepts nuts to secure the window glass and a butyl sealant around the window glass to seal the window glass. Securing the window glass with urethane adhesive is time consuming and expensive process because it requires priming the bonding surfaces, significant cure time, and significant in-plant investment. Securing the window glass with threaded studs is also a time consuming and expensive process because it requires handling of nuts and capital equipment to drive the nuts onto the studs.

In the automobile industry, there is a never ending desire to simplify and/or speed up the assembly process. There is also a never ending desire to reduce cost of components and/or the assembly process without negatively affecting performance. Accordingly, there is a need in the art for an improved window assembly for vehicles.

SUMMARY OF THE INVENTION

The present invention provides a window assembly for a vehicle that addresses at least some of the above-noted problems of the related art. According to the present invention, a window assembly for a vehicle having a body panel comprises, in combination, a glazing panel having a peripheral edge, a gasket secured to the glazing panel for sealing the peripheral edge to the body panel, at least one clip receiver secured to the glazing panel near the peripheral edge, and at least one U-shaped fastener clip having a pair of resilient legs receiving the body panel and the clip receiver therebetween to clamp the clip receiver to the body panel.

According to another aspect of the present invention, a window assembly for a vehicle having a body panel comprises, in combination, a glazing panel having a peripheral edge, a gasket secured to the glazing panel for sealing the peripheral edge to the body panel, at least one clip receiver secured to the glazing panel near the peripheral edge, and at least one fastener clip clamping the clip receiver to the body panel. The fastener clip is secured to the clip receiver in a manner in which the fastener clip is movable relative the clip receiver between a shipping position wherein the legs do not receive the body panel and the clip receiver therebetween and a securing position wherein the legs receive the body panel and the clip receiver therebetween.

According to yet another aspect of the present invention, a window assembly for a vehicle having a body panel comprises, in combination, a glazing panel having a peripheral edge, a gasket secured to the glazing panel for sealing the peripheral edge to the body panel, at least one clip receiver secured to the glazing panel near the peripheral edge, and at least one fastener clip clamping the clip receiver to the body panel. A detent is formed between the fastener clip and the clip receiver to resist removal of the fastener clip from the clip receiver.

From the foregoing disclosure and the following more detailed description of various preferred embodiments it will be apparent to those skilled in the art that the present invention provides a significant advance in the technology of window assemblies for vehicles. Particularly, the invention provides an easily manufactured, low cost and low weight assembly which is quickly installed with low capital investment while maintaining desired performance requirements. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 10 is an enlarged, fragmented cross-sectional view similar to FIG. 3 but showing a window assembly according to a second embodiment of the present invention, wherein the fastener clip is removed for clarity;

FIG. 11 is a top plan view of a clip receiver of the window assembly of FIG. 10;

FIG. 12 is a front elevational view of the clip receiver of FIG. 11;

FIG. 13 is a front elevational view of the fastener clip of the window assembly of FIG. 10;

FIG. 14 is an end elevational view of the fastener clip of FIG. 13;

FIG. 15 is a front elevational view similar to FIG. 13 but showing a variation of the fastener clip for the window assembly of FIG. 10;

FIG. 16 is an end elevational view of the fastener clip of FIG. 15; and

FIG. 17 an enlarged, fragmented cross-sectional view similar to FIG. 10 but showing a variation of the clip receiver, wherein the fastener clip is removed for clarity.

Figure 1:
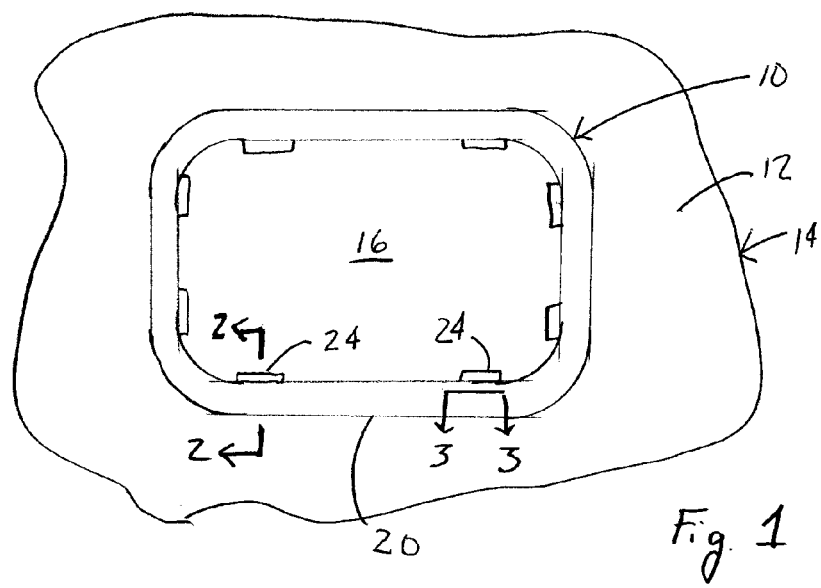
FIG. 1 is an elevational view of a window assembly secured to a vehicle according a preferred embodiment of the present invention.

It should be understood that the appended drawings are not necessarily to scale, presenting a somewhat simplified representation of various preferred features illustrative of the basic principles of the invention. The specific design features of the window assembly as disclosed herein, including, for example, specific dimensions, orientations, and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the window assemblies illustrated in the drawings. In general, up or upward refers to an upward direction generally in the plane of the paper in FIG. and down or downward refers to a downward direction generally in the plane of the paper in FIG. 1. Also in general, fore or forward refers to a direction generally into of the plane of the paper in FIG. 1 and aft or rearward refers to a direction generally out of the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the window assemblies disclosed herein. The following detailed discussion of various alternative and preferred embodiments will illustrate the general principles of the invention with reference to a window assembly for use with a motor vehicle such as an automobile, van, truck, sport utility vehicle, crossover vehicle, or the like. Other embodiments suitable for other applications will be apparent to those skilled in the art given the benefit of this disclosure. It is noted that the present invention can be utilized with any vehicle having windows including buses, trailers, recreational vehicles, earth moving equipment and the like, off road vehicles such as dune buggies and the like, air borne vehicles, and water borne vehicles.

The term "snap-fit" or "snap-lock" is used herein and in the claims to mean a connection between at least two components wherein at least one of the components has a protrusion and/or abutment which engages the other component to form an interlock or interference which retains the components together when they are connected and at least one of the components has a resiliently deformable or deflectable portion such that the deflectable portion deflects to remove the interference as the parts are brought together and resiliently snaps back to reform the interference when the components are together. The term "unitary" is used herein and in the claims to mean a member made of a single continuous material, such as, for example a molded component. The term "integral" is used herein and in the claims to mean two or more members that are rigidly secured together such as, for example, two members connected by over-molding, fasteners or the like.

Figure 2:
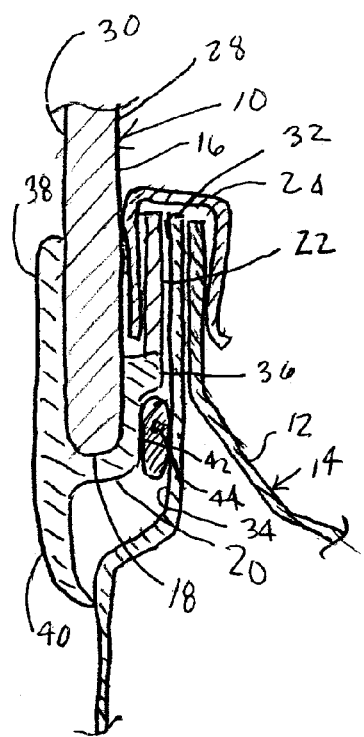
FIG. 2 is an enlarged, fragmented cross-sectional view taken along line 2-2 of FIG. 1.
Figure 3:
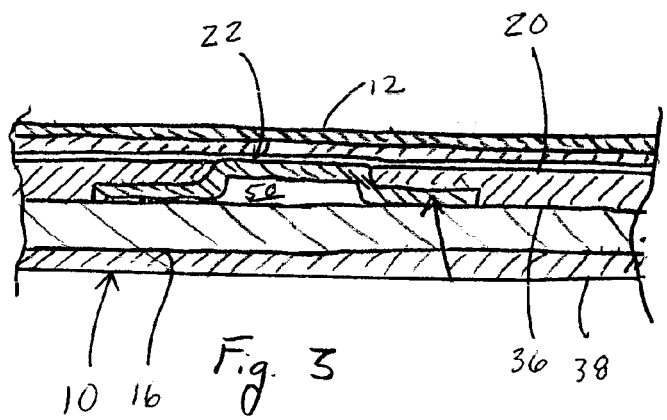
FIG. 3 is an enlarged, fragmented cross-sectional view taken along line 3-3 of FIG. 1, wherein a fastener clip is removed for clarity.

Referring now to the drawings, FIGS. 1 to 3 show a window assembly 10 secured to a body panel 12 of a vehicle 14 according to a preferred embodiment of the present invention. The illustrated window assembly 10 includes a window or glazing panel 16 having a peripheral edge 18, a gasket 20 secured to the glazing panel 16 for sealing the peripheral edge 18 to the body panel 12, at least one clip receiver 22 secured to the glazing panel 16 near the peripheral edge 18, and at least one U-shaped fastener clip 24 having a pair of resilient legs 26 receiving the body panel 12 and the clip receiver 22 therebetween to clamp the clip receiver 22 to the body panel 12 and to secure the glazing panel 16 to the body panel 12.

The glazing panel 16 is a panel comprised of glass and/or plastic having an inner or forward surface 28 and an outer or rearward surface 30 that is substantially planar to the inner surface 28. The illustrated glazing panel 16 is generally planar where the inner and outer surfaces 28, 30 are parallel and planar but it is noted that the glazing panel 16 can be curved within the scope of the present invention. The peripheral edge 18 of the glazing panel can be of any suitable shape to close an opening 32 formed by the vehicle body panels 12. The glazing panel 16 is sized larger than the opening 32 so that a portion of the inner surface 28 near the peripheral edge 18 is located adjacent a seat 34 formed in the body panels 12 (best shown in FIG. 2).

The illustrated gasket 20 is molded of a resinous polymeric material such as, for example, polyvinylchloride or reaction injection molded polyurethane. The gasket 20 is shaped as a generally continuous, resilient member in a suitable mold apparatus. Generally parallel and spaced apart flanges 36, 38 extend over the inner and outer surfaces 28, 30 of the glazing panel 16 respectively at the peripheral edge 18 and extend inwardly toward the center of the glazing panel 16 a predetermined distance to envelope and encapsulate the glazing panel peripheral edge 18 and adhere to the glazing panel surfaces 28, 30. The illustrated gasket 20 encapsulates the entire peripheral edge 18 of the glazing panel 16. The illustrated gasket 20 also includes a radially-outward extending resilient sealing flange 40 which preferably engages the body panel 12 near but outside the seat 34.

The illustrated inner flange 36 is provided with a recess or seat 42 for a bead 44 of butyl sealant or the like which extends entirely about the glazing panel 16. The butyl sealant is located between the gasket 20 and the body panel 12 to form a fluid-tight seal therebetween.

The illustrated glazing panel 16 is secured by a plurality the clip receivers 22 and a plurality of the fastener clips 24. Specifically there are two fastener clips 24 located on each of the four sides of the glazing panel 16 for a total of eight fastener clips 24. It is noted, however, that any other suitable number of fastener clips 24 can be utilized depending on the application requirements.

Figure 4:
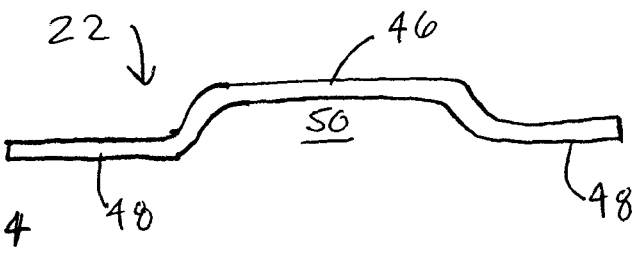
FIG. 4 is a top plan view of a clip receiver of the window assembly of FIG. 1.
Figure 5:
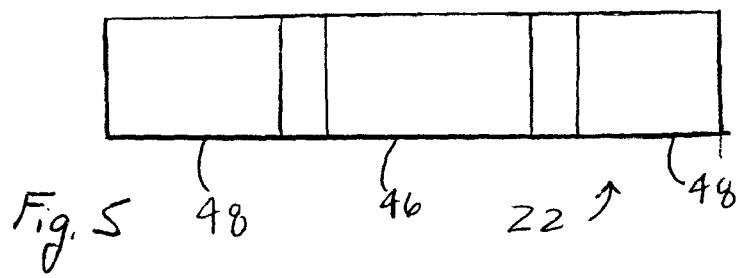
FIG. 5 is a front elevational view of the clip receiver of FIG. 4.

As best shown in FIGS. 4 and 5, the illustrated clip receiver 22 is generally rectangular shaped having an offset central portion 46 located between end portions 48. The offset central portion 46 forms a generally elongate slot or opening 50 sized and shaped to receive the outer leg 26 of the fastener clip 24 as described in more detail hereinafter. The clip receiver 22 can comprise a suitable metal such as spring steel or a suitable plastic such as a thermoplastic or thermoset material which can withstand the required loads. The clip receiver 22 preferably comprises a material having a hardness greater than a hardness of the material forming the gasket 20 and having a tensile strength greater than the material forming the gasket 20. Thus, the clip receiver 22 is preferably not unitary with the gasket 20, that is, the gasket 20 and the clip receiver 22 are preferably separate components.

As best shown in FIG. 2, the clip receivers 22 are rigidly secured to the glazing panel 16 near the peripheral edge 18 so that the clip receivers 22 are positioned between the glazing panel 16 and the body panel 12. Preferably, an inner edge of the clip receiver 22 is flush with the edge of the body panel 12 forming the opening 32. The illustrated end portions 48 of the clip receiver 22 engage the inner surface 28 of the glazing panel 16 so that the offset central portion 46 is spaced from the inner surface 28 of the glazing panel 16 with the glazing panel 16 closing the open outer side of the slot 50. The illustrated clip receiver 22 is secured to the glazing panel 16 by overmolding the gasket 20 over the end portions 48 to secure the clip receiver 22 to the glazing panel 16. Formed in this manner, the glazing panel, 16, the gasket 20, and the clip receiver 22 form an integral assembly. It is noted that the illustrated gasket 20 closes the outer end of the slot 50 but does not substantially extend into the slot 50 so that the slot is in the form of a pocket open only at an inner end adjacent the edge of the body panel 12 forming the opening 32. The slot 50 is sized and shaped for receiving the outer leg 26 of the fastener clip 24 as described in more detail hereinafter. It is noted that the clip receiver 22 can alternatively be secured to the glazing panel 16 in any other suitable manner.

Figures 6, 7:
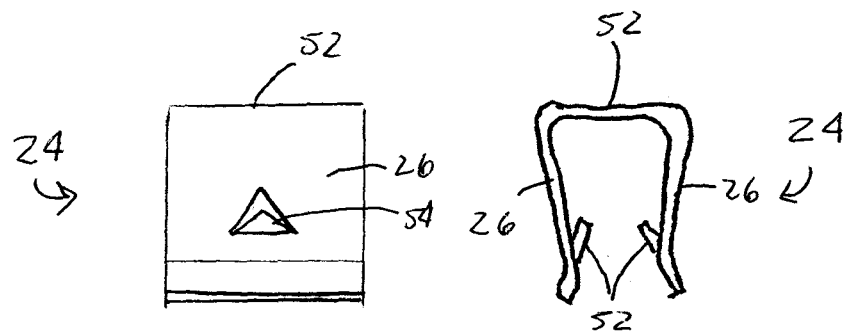
FIG. 6 is a front elevational view of the fastener clip of the window assembly of FIG. 1.
FIG. 7 is an end elevational view of the fastener clip of FIG. 6.

As best shown in FIGS. 6 and 7, the illustrated fastener clip 24 is C-shaped having the pair of resilient legs 26 outwardly extending from a base portion 52. The legs 26 are sized and shaped for receiving the body panel 12 and the clip receiver 22 therebetween to clamp the clip receiver 22 to the body panel 12. The fastener clip 24 can comprise a suitable metal such as spring steel or a suitable plastic such as a thermoplastic or thermoset material which can withstand the required loads. The fastener clip 24 preferably comprises a material having a resiliency to provide a clamping force between the body panel 12 and the clip receiver 22. The legs 26 of the illustrated fastener clip 24 are each provided with an inwardly directed reverse barb 54 to prevent back-out of the fastener clip 24. It is noted that any other suitable means for preventing back-out can alternatively be utilized.

As best shown in FIG. 2, to install the window assembly 10, the glazing panel/gasket/clip receiver assembly is placed in the seat 34 of the body panel 12 so that the opening 32 is covered by the glazing panel 16 with the bead 44 of butyl sealant placed between the gasket 20 and the body panel 12 to seal the assembly to the body panel 12. Positioned in this manner, the open inner end of the slot 50 is located adjacent the edge of the body panel 12 forming the opening 32. The outer leg 26 of the fastener clip 24 is then slid into the slot 50 so that the resilient legs 26 of the fastener clip 24 receive the body panel 12 and the clip receiver 22 therebetween to clamp the clip receiver 22 to the body panel 12. Installation is complete and the window assembly 10 is secured to the vehicle 14 once all of the fastener clips 24 have been slid into place. It is noted that no other fastening means is needed. It is also noted that while the illustrated components are adapted for sliding movement of the fastener clips 24 substantially perpendicular to the peripheral edge 18 of the glazing panel 16, the fastener clips 24 can alternatively enter at an angle for tight packaging conditions.

Figure 8:
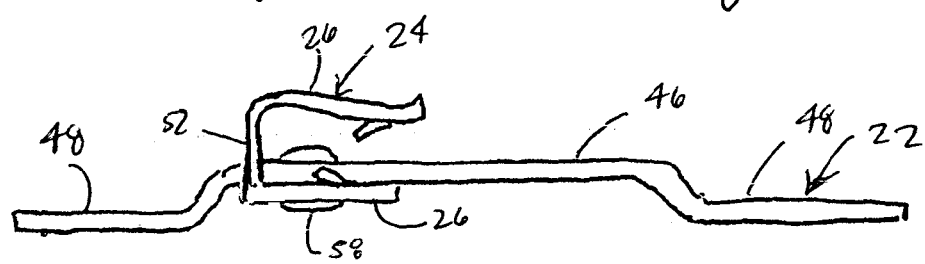
FIG. 8 is a top plan view of a variation of the clip receiver and the fastener clip of FIGS. 4 to 7.
Figure 9:
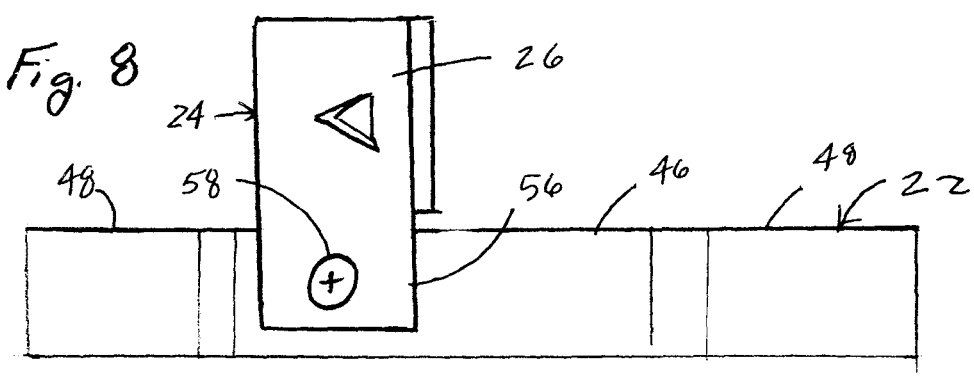
FIG. 9 is a front elevational view of the clip receiver and the fastener clip of FIG. 8.

As best shown in FIGS. 8 and 9, the fastener clip 24 can be secured to the clip receiver 22 in a manner in which the fastener clip 24 is movable relative the clip receiver 22 between a shipping position wherein the legs 26 do not receive the body panel 12 and the clip receiver 22 therebetween and a securing position wherein the legs 26 receive the body panel 12 and the clip receiver 22 therebetween. An extension 56 is provided on the inner leg 26 of the fastener clip 24 and the extension 56 is pivotably connected to the central portion 46 of the clip receiver 22. The extension 56 can be pivotably connected in any suitable manner such as with a rivet 58 or the like. Mounted in the manner, the window assembly 10 can be shipped with the fastener clips 24 in the vertical shipping position (best shown in FIG. 9) and then pivoted to the securing position (best shown in FIG. 2) during installation of the window assembly 10 into the vehicle 14. With the fastener clip 24 secured to the clip receiver 22 in this manner, the assembly process is simplified because separate or loose components are eliminated.

FIG. 10 illustrates a window assembly 10a according to a second embodiment of the present invention which is substantially the same as the first embodiment described hereinabove. The window assembly 10a illustrates that the clip receiver 22 can be secured to the glazing panel 16 with adhesive 60. The adhesive 26 can comprise solely a layer of adhesive and/or adhesive tape. The window assembly 10a also illustrates that a detent 62 can be formed between the fastener clip 24 and the clip receiver 26 to resist removal or backing out of the fastener clip 24 from the clip receiver 26. The illustrated detent 62 includes providing the clip receiver 22 with a post 64 extending perpendicular to the glazing panel inner surface 28 within the slot 50 and providing the rearward leg 26 of the fastener clip with an opening 66 sized and shaped for receiving the post 64 with a snap-fit connection when the leg 26 is slid into the slot 50.

As best shown in FIGS. 11 and 12, the illustrated clip receiver 22 has a rearward central portion 68 connecting the end portions 48 and closing the rearward side of the slot 50. The post 64 forwardly extends from the forward side of the rearward central portion 68 within the slot 50. The illustrated post 64 is cylindrically-shaped but any other suitable shape can alternatively be utilized. The illustrated offset central portion 46 is broken to form an opening 70 opposite the post 64 for ease of molding the clip receiver 22. It is noted that the opening 50 can alternatively be eliminated if desired such as, for example, the post 64 could alternatively connect the central portions 46, 68.

As best shown in FIGS. 13 and 14, the illustrated fastener clip 24 includes the opening 70 in the rearward leg 26 which is sized and shaped for receiving the post 64 therein. A slot 72 is formed from the opening 70 to the lower edge 74 of the leg 26 so that the post 64 can be inserted into the opening 70 by sliding the leg 26 into the clip receiver slot 50 as described hereinabove. The clip slot 72 has a width smaller than the width of the opening 70 and the post 64 to form a snap fit connection. The slot 72 spreads as the post 64 is forced therethrough and resiliently returns once the post 64 is within the opening 70. Once in the opening 70, removal of the fastener clip 24 from the clip receiver 22 is resisted by the post 64 being located within the opening 70. The illustrated clip slot 72 is provided with an angled entrance 76 at the lower edge 74 so that the force required for insertion is less than the force required for withdrawal. It is noted that the detent 62 can alternatively have other suitable forms such as, for example, there can be two laterally spaced-apart posts that are received in notches located at the sides of the fastener clip leg 26.

As best shown in FIGS. 15 and 16, the fastener clip 24 can be provided with the detent 62 and adapted to be movable between a shipping position and a securing position. The illustrated fastener clip 24 is provided with an extension 78 on the rearward leg 26 that has a second opening 80 and a second slot 82 each in alignment and connected to the first opening 70 and the first slot 72. Formed in this manner the fastener clip 24 can be secured in the shipping position by partially inserting the fastener clip 24 so that the post 64 is within the second opening 80 then further linearly slid to the securing position (best shown in FIG. 2) with the post 64 in the first opening 70 when installing the window assembly 10 into the vehicle 14. It is noted that the slot 50 must have suitable depth for the extension 78 which can be provided by increasing the size of the clip receiver 22 and/or extending the pocket into the gasket 20. With the fastener clip 24 secured in this manner, the assembly process is simplified because separate or loose components are eliminated.

FIG. 17 illustrates a variation of the clip receiver 22 wherein the clip receiver 22 is inverted so that the post 64 extends rearwardly from the offset central portion 46 within the slot 50. This variation illustrates that the clip receiver 22 and detent 62 can alternatively have any other suitable form.

It is noted that each of the features of the various embodiments can be utilized with each of the other embodiments. For example, the pivoting fastener clip 24 of FIGS. 8 and 9 could be provided with the detent of the fastener clip 24 of FIGS. 13 and 14.

It is apparent from the foregoing disclosure that the window assemblies according to the present invention are secured to the body panel 12 solely by the fastener clips 24. The use of urethane adhesive, threaded fasteners, and the like is completely eliminated. Thus, the present invention allows the OEM to use the lower investment butyl sealant around the periphery of the glazing panel with a quicker installation time and reduced capital by only pushing clips into place rather than driving nuts or bolts. Additionally, holes or openings in the body panel 12 for the bolts can be eliminated. Because the clips are removable, the present invention also faster and simpler in the filed replacement and service.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A window assembly for a vehicle having a body panel with an edge, said window assembly comprising, in combination:
   a glazing panel having a peripheral edge and an inner surface;
   a gasket secured to the glazing panel for sealing the peripheral edge to the body panel;
   at least one clip receiver secured to the glazing panel near the peripheral edge;
   wherein the clip receiver forms a slot generally parallel to the inner surface of the glazing panel and the edge of the body panel;
   at least one U-shaped fastener clip having a pair of resilient legs resiliently biased toward one another and spaced apart a distance to resiliently clamp the clip receiver and the body panel between the legs;
   wherein the clip receiver comprises a first material, the gasket comprises a second material, and the first material has a hardness greater than the second material; and
   wherein one of the legs extends into the slot of the clip receiver with the edge of the body panel extending between the legs to clamp the clip receiver to the body panel between the legs.

2. The window assembly according to claim 1, wherein the gasket encapsulates the peripheral edge and secures the fastener clip to the glazing panel.

3. The window assembly according to claim 1, wherein the fastener clip is bonded to the glazing panel with adhesive.

4. The window assembly according to claim 1, wherein there are a plurality of the fastener clips and the fastener clips are the only means for fastening the glazing panel to the body panel.

5. The window assembly according to claim 1, wherein the fastener clip is secured to the clip receiver in a manner in which the fastener clip is movable relative the clip receiver between a shipping position wherein the legs do not receive the body panel and the clip receiver therebetween and a securing position wherein the legs receive the body panel and the clip receiver therebetween.

6. The window assembly according to claim 5, wherein the clip is pivotally connected to the clip receiver and pivots from the shipping position to the securing position.

7. The window assembly according to claim 5, wherein the clip linearly moves from the shipping position to the securing position.

8. The window assembly according to claim 1, wherein a detent is formed between the fastener clip and the clip receiver to resist removal of the fastener clip from the clip receiver.

9. The window assembly according to claim 1, wherein the clip receiver and the fastener clip are formed as separate components.

10. A window assembly for a vehicle having a body panel, said window assembly comprising, in combination:
    a glazing panel having a peripheral edge;
    a gasket secured to the glazing panel for sealing the peripheral edge to the body panel;
    at least one clip receiver secured to the glazing panel near the peripheral edge; and
    at least one fastener clip clamping the clip receiver to the body panel;
    wherein the fastener clip has a pair of resilient legs extending from opposed ends of a base portion, resiliently biased toward one another, and spaced apart a distance to resiliently clamp the clip receiver and the body panel between the legs;
    wherein the fastener clip is secured to the clip receiver in a manner in which the fastener clip is movable relative the clip receiver between a shipping position wherein the legs do not receive the body panel and the clip receiver therebetween and a securing position wherein the legs receive the body panel and the clip receiver therebetween; and
    wherein the clip is pivotally secured to the clip receiver so that the clip pivots relative to the clip receiver from the shipping position to the securing position.

11. The window assembly according to claim 10, wherein there are a plurality of the fastener clips and the fastener clips are the only means for fastening the glazing panel to the body panel.

12. The window assembly according to claim 10, wherein the clip receiver comprises a first material, the gasket comprises a second material, and the first material has a hardness greater than the second material.

13. The window assembly according to claim 10, wherein a detent is formed between the fastener clip and the clip receiver to resist removal of the fastener clip from the clip receiver.

14. The window assembly according to claim 10, wherein the clip receiver and the fastener clip are formed as separate components.

15. A window assembly for a vehicle having a body panel, said window assembly comprising, in combination:
- a glazing panel having a peripheral edge;
- a gasket secured to the glazing panel for sealing the peripheral edge to the body panel;
- at least one clip receiver secured to the glazing panel near the peripheral edge; and
- at least one fastener clip having a pair of resilient legs and clamping the clip receiver to the body panel;
- wherein a detent is formed between the fastener clip and the clip receiver to resist removal of the fastener clip from the clip receiver;
- wherein the detent comprises a post of the clip receiver, an opening formed in one of the legs of the fastener clip for the receiving the post, and a slot extending from and edge of the fastener clip to the opening for removably inserting the post into the opening; and
- wherein the slot has a width smaller than a width of the post.

16. The window assembly according to claim 15, wherein there are a plurality of the fastener clips and the fastener clips are the only means for fastening the glazing panel to the body panel.

17. The window assembly according to claim 15, wherein the clip receiver comprises a first material, the gasket comprises a second material, and the first material has a hardness greater than the second material.

18. The window assembly according to claim 15, wherein the detent forms a snap-lock connection between the fastener clip and the clip receiver.

19. The window assembly according to claim 15, wherein the clip receiver and the fastener clip are formed as separate components.

20. The window assembly according to claim 15, wherein the fastener clip is secured to the clip receiver in a manner in which the fastener clip is movable relative the clip receiver between a shipping position wherein the legs do not receive the body panel and the clip receiver therebetween and a securing position wherein the legs receive the body panel and the clip receiver therebetween, and wherein the clip linearly moves from the shipping position to the securing position.

* * * * *